United States Patent
Brugler et al.

(10) Patent No.: US 8,271,951 B2
(45) Date of Patent: Sep. 18, 2012

(54) SYSTEM AND METHODS FOR COLLECTING SOFTWARE DEVELOPMENT FEEDBACK

(75) Inventors: Thomas S. Brugler, Fuquay-Varina, NC (US); Mark E. Molander, Cary, NC (US); Kerry A. Ortega, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1233 days.

(21) Appl. No.: 12/042,245

(22) Filed: Mar. 4, 2008

(65) Prior Publication Data

US 2009/0228789 A1      Sep. 10, 2009

(51) Int. Cl.
*G06F 9/44* (2006.01)

(52) U.S. Cl. ........ 717/125; 717/102; 717/105; 717/109; 717/113; 715/701

(58) Field of Classification Search .................. None
See application file for complete search history.

(56) References Cited

U.S. PATENT DOCUMENTS

| | | | |
|---|---|---|---|
| 5,617,522 A | 4/1997 | Peltier | |
| 6,008,811 A * | 12/1999 | McMillan | 715/769 |
| 6,252,583 B1 * | 6/2001 | Braun et al. | 345/156 |
| 6,509,914 B1 | 1/2003 | Babula et al. | |
| 7,055,129 B2 * | 5/2006 | Ball | 717/107 |
| 7,562,344 B1 * | 7/2009 | Allen et al. | 717/113 |
| 7,669,177 B2 * | 2/2010 | Gerber et al. | 717/100 |
| 7,702,671 B2 * | 4/2010 | Jacobs et al. | 707/705 |
| 8,037,449 B2 * | 10/2011 | Iborra et al. | 717/105 |
| 8,117,667 B2 * | 2/2012 | Merkle et al. | 726/29 |
| 2001/0052110 A1 * | 12/2001 | Orbanes et al. | 717/1 |
| 2002/0060701 A1 * | 5/2002 | Naughton et al. | 345/853 |
| 2003/0016252 A1 * | 1/2003 | Noy et al. | 345/856 |
| 2003/0046657 A1 * | 3/2003 | White | 717/105 |
| 2003/0095143 A1 | 5/2003 | Lauris | |
| 2004/0046763 A1 * | 3/2004 | Ball | 345/581 |
| 2004/0130572 A1 | 7/2004 | Bala | |
| 2004/0221239 A1 | 11/2004 | Hachigian et al. | |
| 2005/0160368 A1 | 7/2005 | Liu et al. | |
| 2005/0192958 A1 * | 9/2005 | Widjojo et al. | 707/5 |
| 2005/0250440 A1 * | 11/2005 | Zhou et al. | 455/12.1 |
| 2006/0161650 A1 * | 7/2006 | Kim et al. | 709/224 |

(Continued)

OTHER PUBLICATIONS

Title: A design approach for Contextualized collaborative recommender system by nurturing the user interactive feedback, author: Supratip Ghose, dated: Nov. 2006, source: IEEE.*

(Continued)

*Primary Examiner* — Chameli Das
(74) *Attorney, Agent, or Firm* — Kunzler Needham Massey & Thorpe

(57) ABSTRACT

A system and method are disclosed for collecting software development feedback. In one embodiment, the method includes collecting a user feedback message associated with a software object. The software object may define a portion of an application user interface. The method may also include categorizing the user feedback message according to a feedback categorization criterion. Additionally, the method may include displaying the user feedback message in a display arranged by a category identified by the categorization criterion.

20 Claims, 7 Drawing Sheets

U.S. PATENT DOCUMENTS

| | | | |
|---|---|---|---|
| 2006/0173801 A1* | 8/2006 | Music | 706/45 |
| 2006/0212142 A1* | 9/2006 | Madani et al. | 700/49 |
| 2007/0027830 A1* | 2/2007 | Simons et al. | 707/1 |
| 2007/0226201 A1* | 9/2007 | Lerum et al. | 707/4 |
| 2009/0187442 A1* | 7/2009 | Kohanim et al. | 705/7 |
| 2010/0305991 A1* | 12/2010 | Diao et al. | 705/7 |
| 2010/0325014 A1* | 12/2010 | Widjojo et al. | 705/26.35 |
| 2012/0089410 A1* | 4/2012 | Mikurak | 705/1.1 |

OTHER PUBLICATIONS

Title: Multi-Mode Multi-User MIMO System with Finite Rate Feedback, author: Kim, J.S et al, source: IEEE, dated:Sep. 6, 2006.*

Quality Control Mechanism for Computer User Interface Design, IBM Technical Disclosure Bulletin, vol. 36, No. 4, pp. 17-18, Apr. 1993.

* cited by examiner

FIG. 6

SYSTEM AND METHODS FOR COLLECTING SOFTWARE DEVELOPMENT FEEDBACK

BACKGROUND OF THE INVENTION

1. Field of the Invention

This invention relates to error reporting for software applications and more particularly relates to a system and method for collecting software development feedback.

2. Description of the Related Art

User feedback is often extremely valuable in software development. Although software developers typically test software applications prior to releasing them to the public, certain flaws in the software may not become apparent until the application is used in the many diverse environments that it may encounter in consumer operation. Furthermore, customers may use the software to perform unexpected functions, with unexpectedly large amounts of data, or in unexpected combinations with other applications. Such uses may uncover hidden flaws in the software application code, the software design, or issues with the usability of the application user interface.

Current feedback methods are cumbersome. One method of providing problem tracking is to provide a customer service call center that users can contact to report problems with the software application. Alternatively, online forums are available for customers to post software problems. However, responses to forum posts are often unreliable and disorganized. Additionally, the posts themselves are typically disorganized, and not sufficiently descriptive.

In such solutions, highly critical issues may be lost in a high volume of forum posts, because there is often no method for indicating the priority of the issue. Forums may also be difficult for the development community, because there are often hundreds of posts that a developer has to sort through to determine what problems users are experiencing. Another problem with these types of error reporting solutions is that they typically require calling in or logging in to a remote system, which may be distracting and difficult to provide sufficient information about the problem. The only alternative is to report on the problem after the fact, relying on memory of the specific details of the issue.

SUMMARY OF THE INVENTION

The present invention has been developed in response to the present state of the art, and in particular, in response to the problems and needs in the art that have not yet been fully solved by currently available error reporting methods and systems. Accordingly, the present invention has been developed to provide a system and method for collecting software development feedback that overcome many or all of the above-discussed shortcomings in the art.

A system of the present invention is presented to collect software development feedback. In one embodiment, the system includes a network configured to facilitate communication of messages between a plurality of network components. The system may also include an application host in communication with the network. The application host may display an application user interface. The application user interface may include an integrated feedback module configured to collect a user feedback message associated with a software object, the software object defining a portion of the application user interface. Additionally, the system may include a feedback data server in communication with the network. The feedback data server may categorize the user feedback message according to a feedback categorization criterion. The system may also include an application development terminal in communication with the network. The application development terminal may display the user feedback message in a display arranged by a category identified by the categorization criterion.

In a further embodiment, the application host may display a selectable identifier configured to recognize a selection event, trigger an interactive message collection mode in response to the selection event, the interactive message collection mode configured to obtain message data, and compile the message data into a user feedback message. The selectable identifier may be integrated into the application user interface.

Additionally, the integrated feedback module may indicate that the interactive message collection mode has been initiated, collect information associated with a software object, the software object defining a portion of the application user interface, collect a description of a problem associated with the application user interface, and obtain a priority rating associated with the problem.

The feedback data server may additionally publish the user feedback message in an interactive forum, the interactive forum configured to obtain a public priority rating. Displaying the user feedback message may include displaying a feedback message topic associated with the user feedback message, and displaying rating information associated with the feedback message topic. In a further embodiment, the feedback message topic is selectable, and the application development terminal is configured to display the user feedback message in response to selection of the feedback message topic.

A method of the present invention is also presented for collecting software development feedback. The method in the disclosed embodiments substantially includes the steps necessary to carry out the functions presented above with respect to the operation of the described system. In one embodiment, the method includes collecting a user feedback message associated with a software object. The software object may define a portion of an application user interface. The method may also include categorizing the user feedback message according to a feedback categorization criterion. Additionally, the method may include displaying the user feedback message in a display arranged by a category identified by the categorization criterion.

A method for deploying computing infrastructure is also presented. The method may include integrating computer-readable code into a computing system, wherein the code in combination with the computing system is configured to perform operations configured to collect software development feedback. The operations may include integrating a feedback module in an application user interface configured to collect a user feedback message associated with a software object, the software object defining a portion of the application user interface. Additionally the operations may include categorizing the user feedback message according to a feedback categorization criterion. The operations may also include displaying the user feedback message in a display arranged by a category identified by the categorization criterion.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 6 is a screenshot view of one embodiment of a developer feedback display arranged by categories.

DETAILED DESCRIPTION OF THE INVENTION

Figure 1:
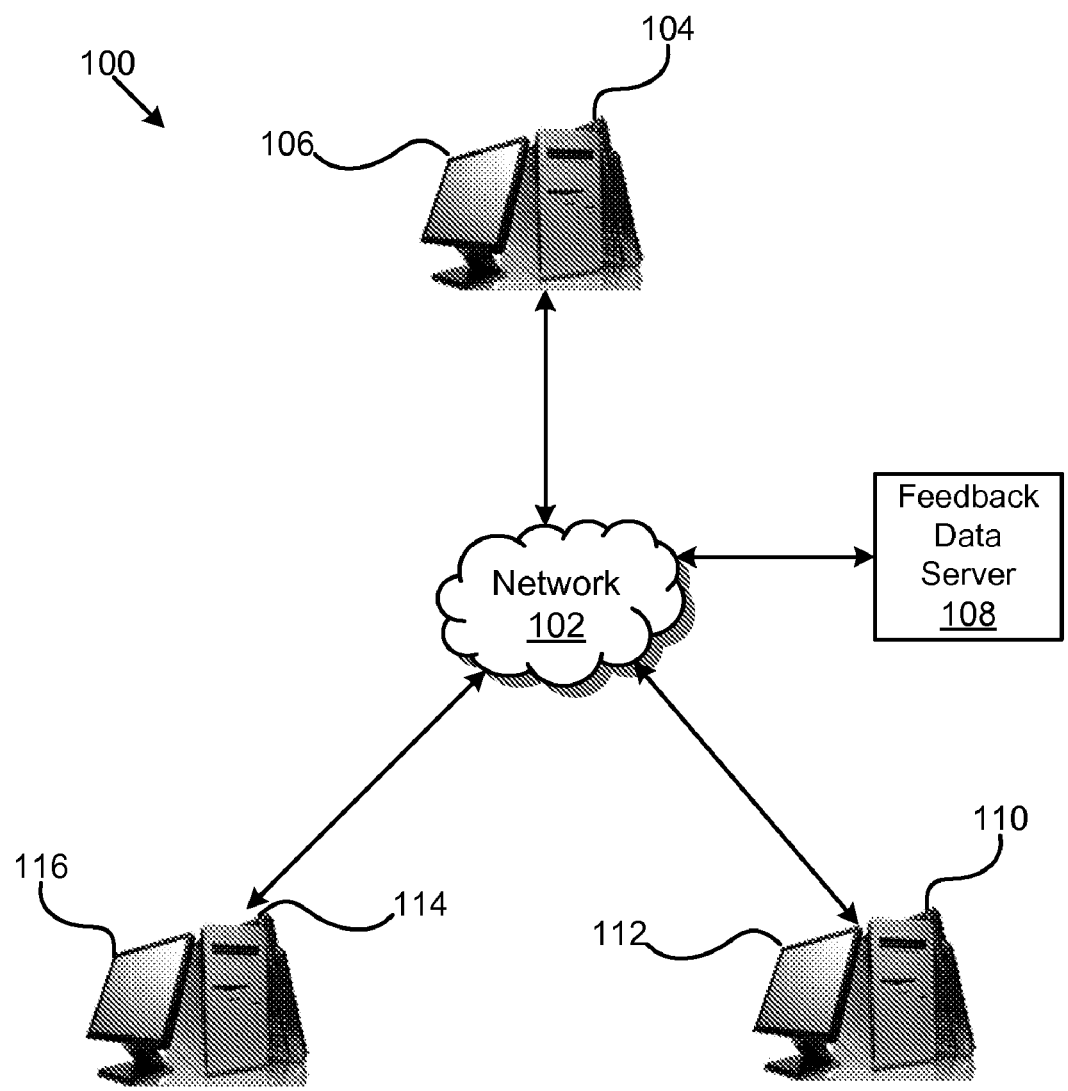
FIG. 1 is a schematic block diagram illustrating one embodiment of a system to collect software development feedback.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment", "an embodiment", or similar language means that a particular feature, structure, or characteristic described in connection with the embodiment is included in at least one embodiment of the present invention. Thus, appearances of the phrases "in one embodiment", "in an embodiment", and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 depicts one embodiment of a system 100 to collect software development feedback. The depicted embodiment includes a network 102, an application host 104, a feedback data server 108, and an application development terminal 110. In a further embodiment, the system 100 may include a user terminal 114. The system 100 may facilitate communication of application related feedback messages between an application user, an application developer, and the public.

In one embodiment, the network 102 facilitates communication of messages between a plurality of network components. In the depicted embodiment, network components may include the feedback data server 108, the application host 104, the application development terminal 110, and the user terminal 114. For example, a user feedback message may be communicated from the application host 104 to the feedback data server 108 through the network 102.

In such an embodiment, an application user may generate a user feedback message on the application host 104. The application host 104 may communicate the user feedback message to the feedback data server 108. In one particular embodiment, the application host 104 may include a display 106 configured to display an application user interface. The application user interface may include an integrated feedback module configured to collect a user feedback message associated with a software object. The software object may comprise a portion of the application user interface. Further embodiments of the application user interface, the integrated feedback module, and the software objects are described below with reference to FIGS. 2-4.

In a particular embodiment, the integrated feedback module may communicate a user feedback message to the feedback data server 108 through the network 102. For example, the integrated feedback module may communicate with a network adapter on the application host 104. The network adapter on the application host 104 may then communicate the user feedback message to the network 102. The network 102 may include various components including routers, switches, hubs, firewalls, etc. The user feedback message may be communicated through these various components until it reaches the feedback data server 108. In one embodiment, the network 102 may include a Local Area Network (LAN). Alternatively, the network 102 may include a Wide Area Network (WAN) or the World Wide Web (WWW) commonly referred to as the internet.

The feedback data server 108 may then categorize the user feedback message according to a feedback categorization criterion. A developer or system administrator may provide various criterion for categorizing the user feedback message. In one embodiment, the user feedback message may be stored in a database of user feedback messages managed by the feedback data server 108. The categorization criterion may be provided as a parameter of a query of the database.

For example, the feedback data server 108 may store a database comprising multiple user feedback messages relating to various software components of an application. Additionally, the user feedback messages may include a priority rating and other information related to the application user interface, software object, and the like. A developer may query the database for user feedback messages. One of the parameters of the query may include the categorization criterion. For example, the query may request user feedback messages categorized by priority. The query result may include a list of user feedback messages arranged in ascending or descending order according to the priority rating associated with each user feedback message.

In a further embodiment, the feedback data server 108 may publish the user feedback messages in a forum. The forum may be publicly accessible through the network 102. Alternatively, the forum may require authorization and authentication of the user. In such an embodiment, a user may read the user feedback message in the forum on the user terminal 114. The user terminal 114 may also include a display 116 for displaying the forum and the user feedback message.

Figure 2:
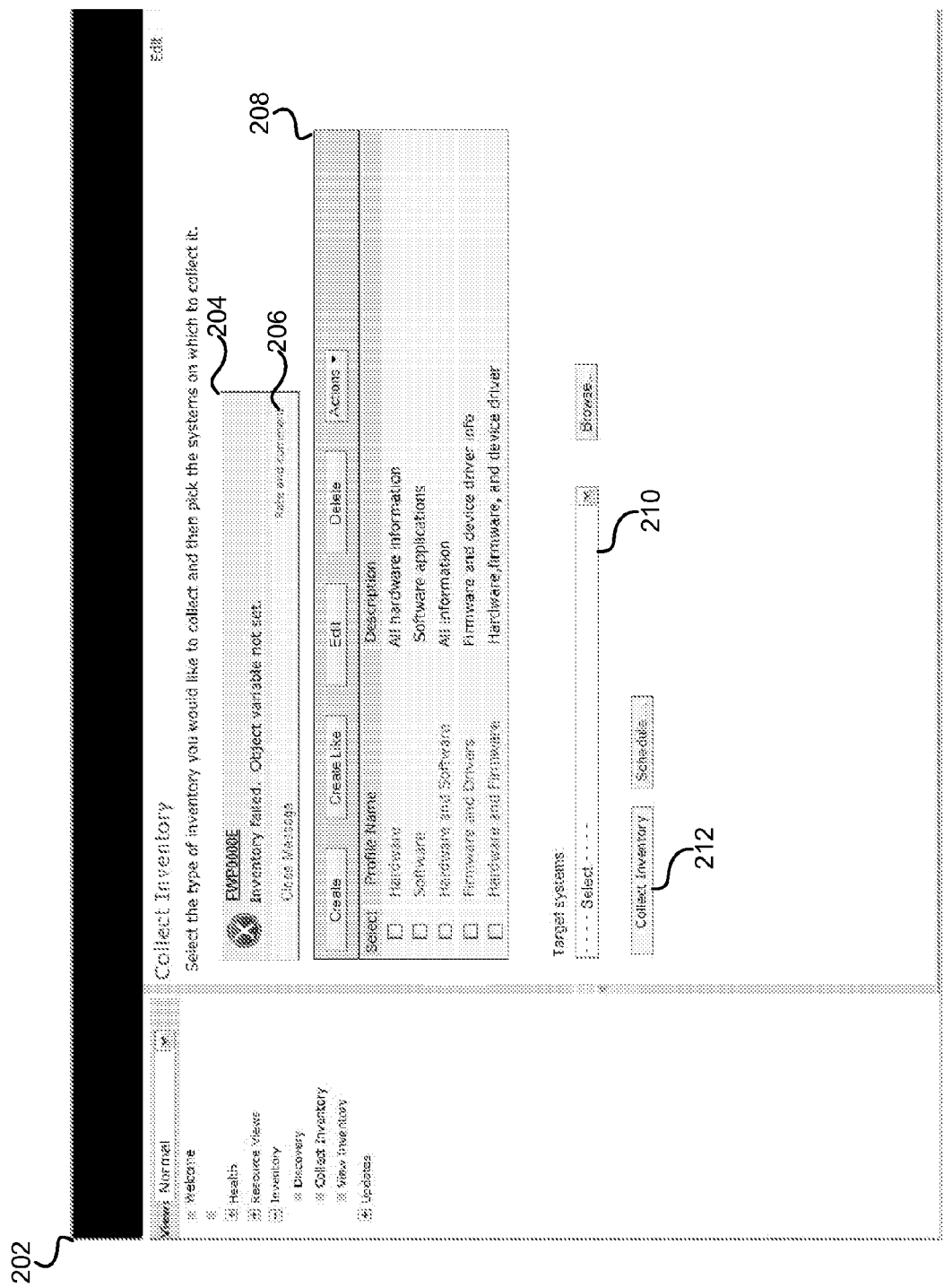
FIG. 2 is a screenshot view of an exemplary application user interface that includes one embodiment of an integrated feedback module.

FIG. 2 illustrates one embodiment of an application user interface 202. The application user interface 202 may include various software objects 208, 210, 212. For example, the application user interface 202 may include a listbox 208 configured to display data to a user. The application user interface 202 may also include a drop-down box 210 configured to provide a list of selectable options to a user. In a further embodiment, the application user interface 202 may include one or more buttons 212 configured to trigger application actions. These various software objects may comprise a graphical interface for facilitating user interactions with a software application hosted by the application host 104. In a particular embodiment, the application user interface 202 may be displayed on the display 106 portion of the application host 104.

In a particular embodiment, the application user interface 202 may include an interactive feedback module. The interactive feedback module may collect a user feedback message associated with one of the software objects 208, 210, 212. For example, the depicted embodiment includes an error message 204 displayed within the application user interface 202. The error message 204 may be displayed in response to the software application encountering an error.

In the depicted embodiment, the error message includes a selectable identifier 206. The selectable identifier 206 may recognize a selection event, such as a click from a user. In the exemplary embodiment depicted in FIG. 2, the selectable identifier is a hyperlink configured to display the text "Rate and Comment". However, the selectable identifier may include a hyper link that displays different text, a selectable button 212, radio button (not shown), or the like.

When an application user selects the selectable identifier 206, an interactive message collection mode may be triggered. The interactive message collection mode may obtain message data from the user, and compile the message data into a user feedback message. Further embodiments of this process are described below with reference to FIGS. 3 and 4. As described in FIG. 2, the selectable identifier 206 may be integrated into the application user interface 202. Additionally, certain functions of the interactive message collection mode may also be integrated into the application user interface 202 as described in FIG. 3.

Figure 3:
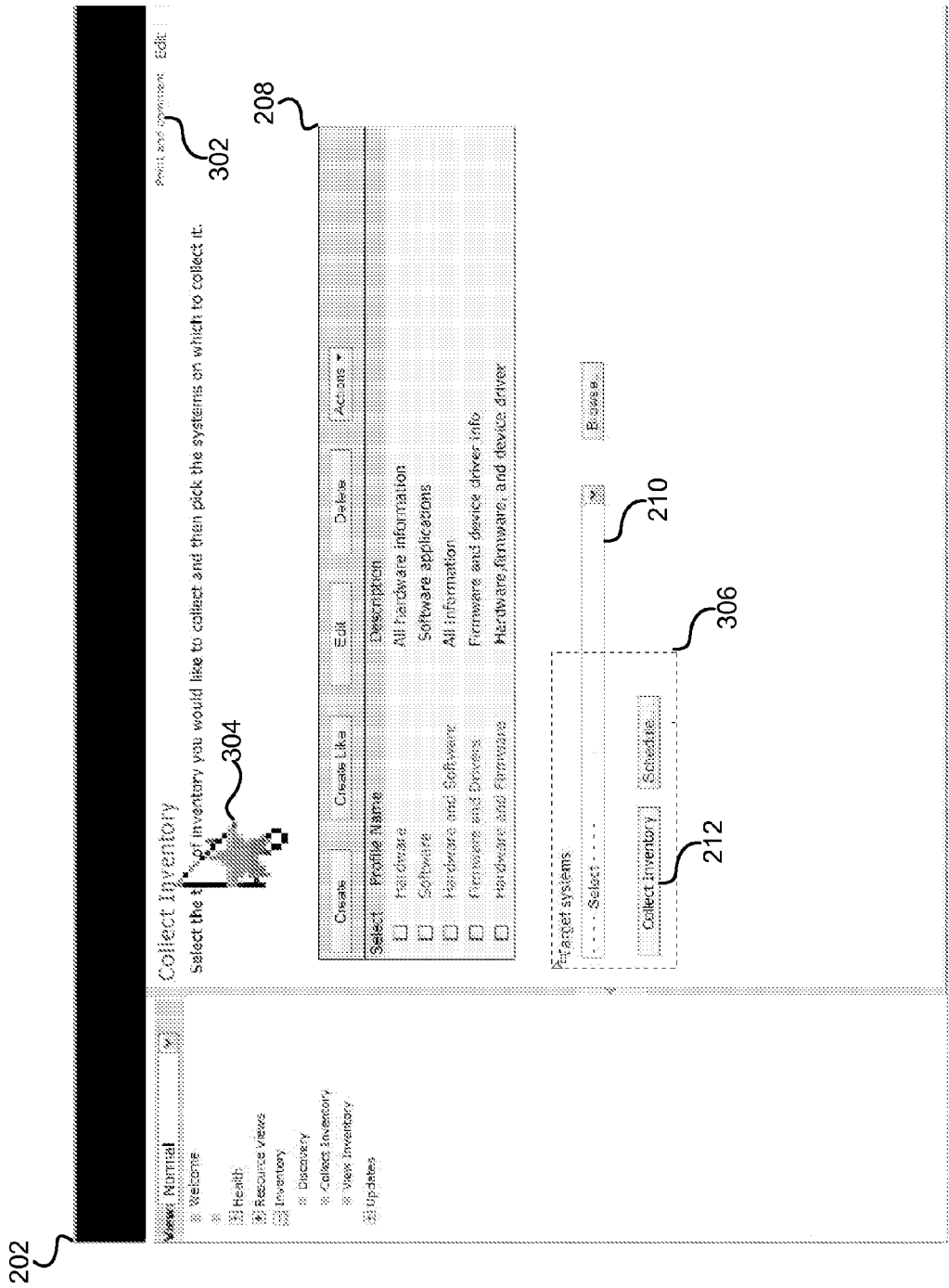
FIG. 3 is a screenshot view of an exemplary application user interface that includes an alternative embodiment of an integrated feedback module.

FIG. 3 illustrates an alternative embodiment of an application user interface 202 with an integrated message collection mode. The depicted embodiment includes the listbox 208, the drop-down menu 210, and the buttons 212 as described above. However, in the depicted embodiment, an error message 204 is not displayed. In the embodiment illustrated in FIG. 3, the selectable identifier 206 is represented by a selectable hyperlink 302 configured to display the text "Point and Comment".

In such an embodiment, the selectable hyperlink 302 may be persistently displayed on the application user interface. In such an embodiment, an application user may initiate the integrated feedback collection module at any point in time, regardless of whether the software has recognized an error and displayed an error message 204. Thus, the application user may provide feedback on software objects that do not trigger an application error, but which may still require improvement. For example, a cumbersome interface may not trigger any error messages 204, however an application user may wish to provide feedback on the usability of the application user interface 202.

In the depicted embodiment, the integrated feedback module may indicate that an interactive feedback collection mode has been initiated by modifying the form of the pointer 304. For example, a star may be added to the pointer 304. Alternatively, the size or color of the pointer 304 may be modified. In another alternative embodiment, an icon or message may be displayed on the application user interface 202 indicating that the interactive feedback collection mode has been initiated.

In a further embodiment, integrated feedback module may collect information associated with a software object or portion of the application user interface 202 that is problematic. For example, the pointer 304 may select a portion of the application user interface 202 to include in the user feedback message. As depicted in FIG. 3, a selection box 306 may indicate a portion of the application user interface 202 to be captured as an image and included in the user feedback message.

In a further embodiment, interactive feedback module may collect other information related associated with the software object. For example, a certain predetermined number of actions that occurred just prior to the error message or when the user triggers the interactive feedback module may be included in a feedback message. This may give some context to what the user may have been trying to do.

The integrated feedback module may additionally include additional interactive displays for collection information from a user regarding the problem with the application user interface. For example, the integrated feedback module may include forms for collecting a description of the problem, for obtaining a priority rating associated with the problem, and the like. A further embodiment of such a form is described in FIG. 4 below.

Figure 4:
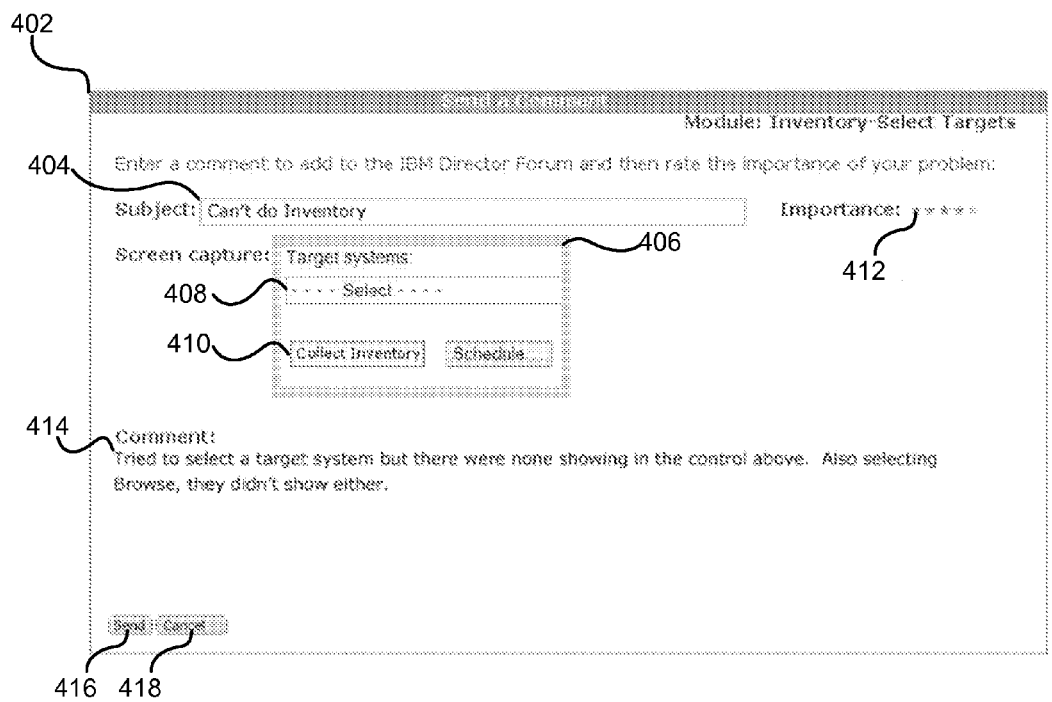
FIG. 4 is a screenshot view of one embodiment of an interactive user feedback form.

FIG. 4 illustrates one embodiment of a user feedback form 402. The user feedback form 402 may be displayed in response to indicia from an application user, such as a click on a hyperlink 302 or a software button 212. Alternatively, the user feedback form 402 may be automatically displayed in response to selection of a portion of the application user interface while the application is in the interactive feedback collection mode.

As depicted in FIG. 4, the user feedback form 402 may include a subject field 404. The user may enter a subject for the user feedback message in the subject field 404. The subject of the user feedback message may be associated with the categorization criterion.

The user feedback form 402 may also include a screen capture field 406 configured to display an image associated with a portion of the application user interface 202 contained by the selection box 306. For example, as described in FIG. 3, the selection box 306 may capture an image of a portion of the drop-down menu 210 and one or more buttons 212. The screen capture field 406 may display an image 408 of the drop down menu 210 and an image 410 of one or more buttons 212.

In a further embodiment, the user feedback form 402 may include a comment field 414. The comment field 414 may capture a textual comment from the user. The comment may describe certain details of the problem encountered by the user in the application user interface 202.

The user feedback form 402 may also include a priority rating field 412. For example, as illustrated in FIG. 4, the priority rating field 412 includes selectable radio buttons configured with the appearance of stars. In such an embodiment, the user may select a priority rating of between zero (0) stars and five (5) stars by clicking on one of the stars. In an alternative embodiment, the user may enter a numerical value associated with the priority rating in a text entry box.

The user feedback form 402 may also include controls for working with the form 402. For example, the depicted embodiment includes a "send" button 416 and a "Cancel" button 418. The send button 416 may submit a completed user feedback message to the feedback data server 108. Alternatively, the send button 416 may trigger the interactive user feedback module to compile the data entered into the various fields of the user feedback form 402 into a user feedback message. The cancel button 418 may delete the user feedback data and return the user to the application user interface 202. In a further embodiment, the user feedback form 402 may include a "clear" button configured to clear all fields 404, 406, 414, and 412 in the user feedback form 402 without returning to the application user interface 202.

Figure 5:
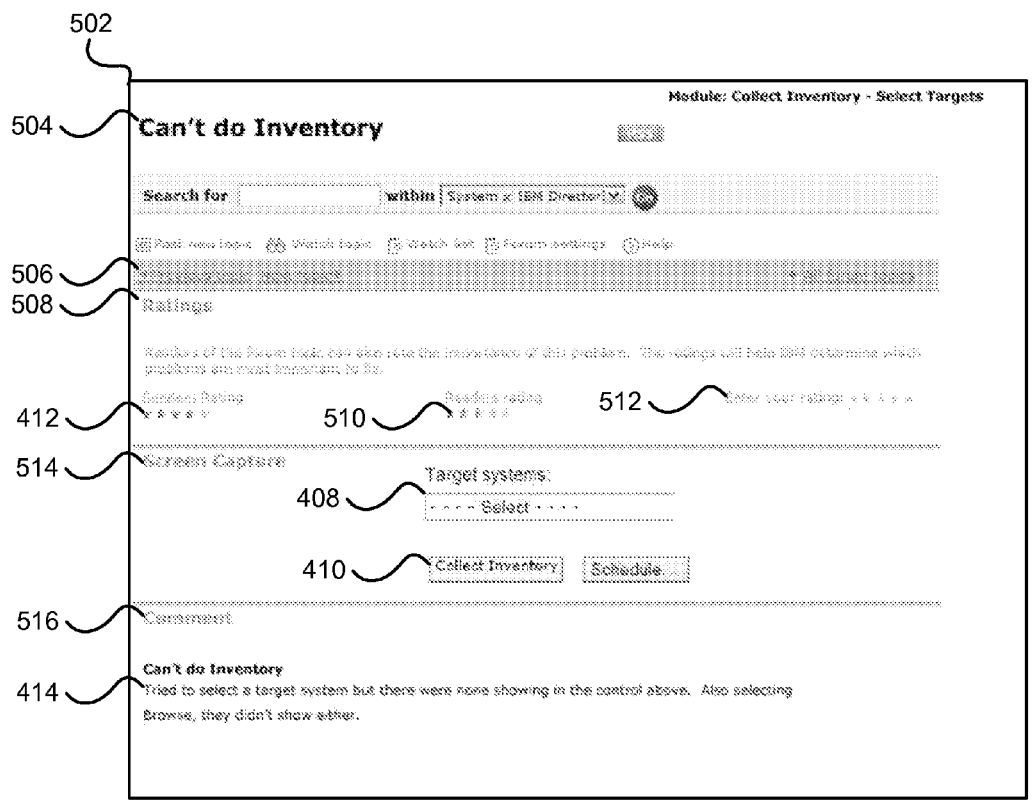
FIG. 5 is a screenshot view of one embodiment of a user feedback message.

FIG. 5 illustrates one embodiment of a user feedback message 502. In a particular embodiment, the user feedback message 502 may include a post to a user feedback forum. Alternatively, the user feedback message 502 may include a compilation of user feedback data stored in a database managed by the feedback data server 108.

In the depicted embodiment, the user feedback message 502 includes a subject 504. The subject 504 may correspond to text entered in the subject field 404. The user feedback message 502 may additionally include other information entered in user feedback form 402. For example, the user feedback message 502 may include a ratings display 508. The ratings display 508 may include the priority rating 412 entered in the user feedback form 402. Additionally, the ratings display 508 may include an indicator of a reader's rating 510 designated by a public user. In a further embodiment, the user feedback message 502 may include an interactive rating control 512 configured to obtain priority rating information from a viewer of the user feedback message 502.

In a further embodiment, the user feedback message 502 includes a screen capture display 514. The screen capture display may include the image of a portion of the interactive user display 202 captured with the selection box 306. For example, as depicted, the screen capture display 514 includes the image 408 of the drop-down menu 210 and the image 410 of the button 212. Similarly, the comment display 516 may display the message text 414 entered in the message field on the user feedback form 402.

The user feedback message 506 may include one or more user controls 506 configured to search for user feedback messages 502 within a forum, or to navigate between user feedback messages 502 in a forum or in a database managed by the feedback data server 108.

Figure 6:
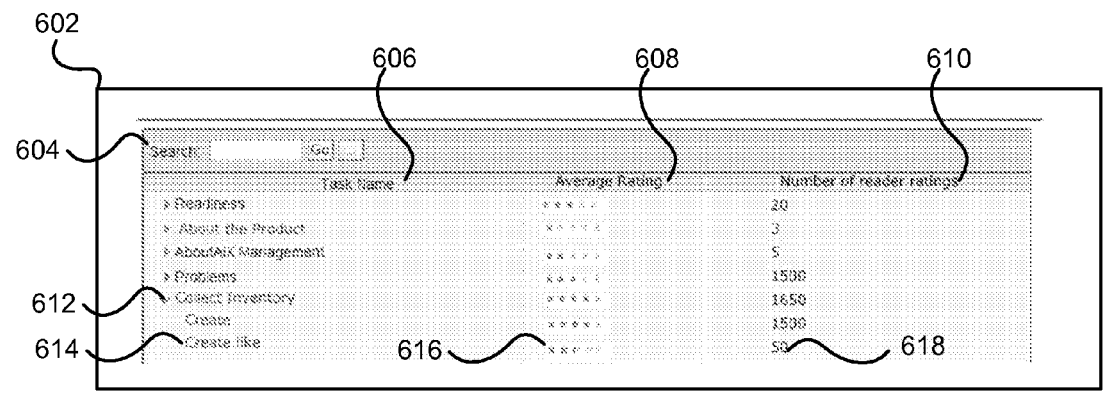

FIG. 6 illustrates one embodiment of a menu 602 of user feedback messages 502. In the depicted embodiment, the menu 602 includes a list of user feedback topics 612. In one embodiment the menu 602 may include a search field for searching for a particular user feedback message 502 or user feedback topic 612. The user feedback topics 612 may include nested sub-topics 614. The menu 602 may include one or more fields for arranging the feedback topics 612. For example, the menu 602 may include a task name field 606, an average rating field 608, an number of reader ratings field 610.

In a certain embodiment, the user feedback topics 612 maybe associated with user feedback messages 502. For example, the user feedback topic 612 may be associated to the subject 504 of the user feedback message 502. In such an embodiment, the user feedback messages 502 may be categorized according to the subject 504 of the user feedback message 502, or according to the general user feedback topic 612 associated with the user feedback message 502. In such an embodiment, the user feedback topic 612 or the subject 504 of the user feedback message 502 may be designated as the categorization criterion. In the depicted embodiment, the user feedback topics 612 are arranged in a task name field 606.

In one embodiment, the average rating field 608 may display some indicia 616 of an average of the priority rating 412 designated by the user and reader's ratings 510 designated by forum readers that have rated the user feedback message. Various mathematical algorithms may be employed to calculate the average or weighted averages. In one embodiment, the user feedback messages 502 or the user feedback topics 612 may be arranged according to the average rating 608 in order to identify high priority topics. In such an embodiment, the average rating indicia 616 is the categorization criterion.

The number of reader's ratings field 610 may include indicia 618 of the number of forum readers that have entered a rating for the user feedback message 502 or the user feedback topic 612. In one embodiment, the user feedback messages 502 or the user feedback topics 612 may be arranged according to the number of reader's ratings 618 in order to determine the most popular common problems with the software. In such an embodiment, the number of reader's ratings indicia 618 is the categorization criterion.

In a further embodiment, the user feedback topics 612 and sub-topics 614 may be selectable hyperlinks. In such an embodiment, when a user clicks on the user feedback topic 612 a user feedback message 502 associated with the user feedback topic 612 may be displayed. Alternatively, a nested list of sub-topics 614 may be displayed. In such an embodiment, sub-topics may also be selected to display additional nested sub-topics or subjects 504 of individual user feedback messages 502. When a subject 504 of a user feedback message 502 is clicked, the user feedback message 502 may be displayed to provide the information associated with the user feedback message 502.

The schematic flow chart diagram that follows is generally set forth as a logical flow chart diagram. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 7:
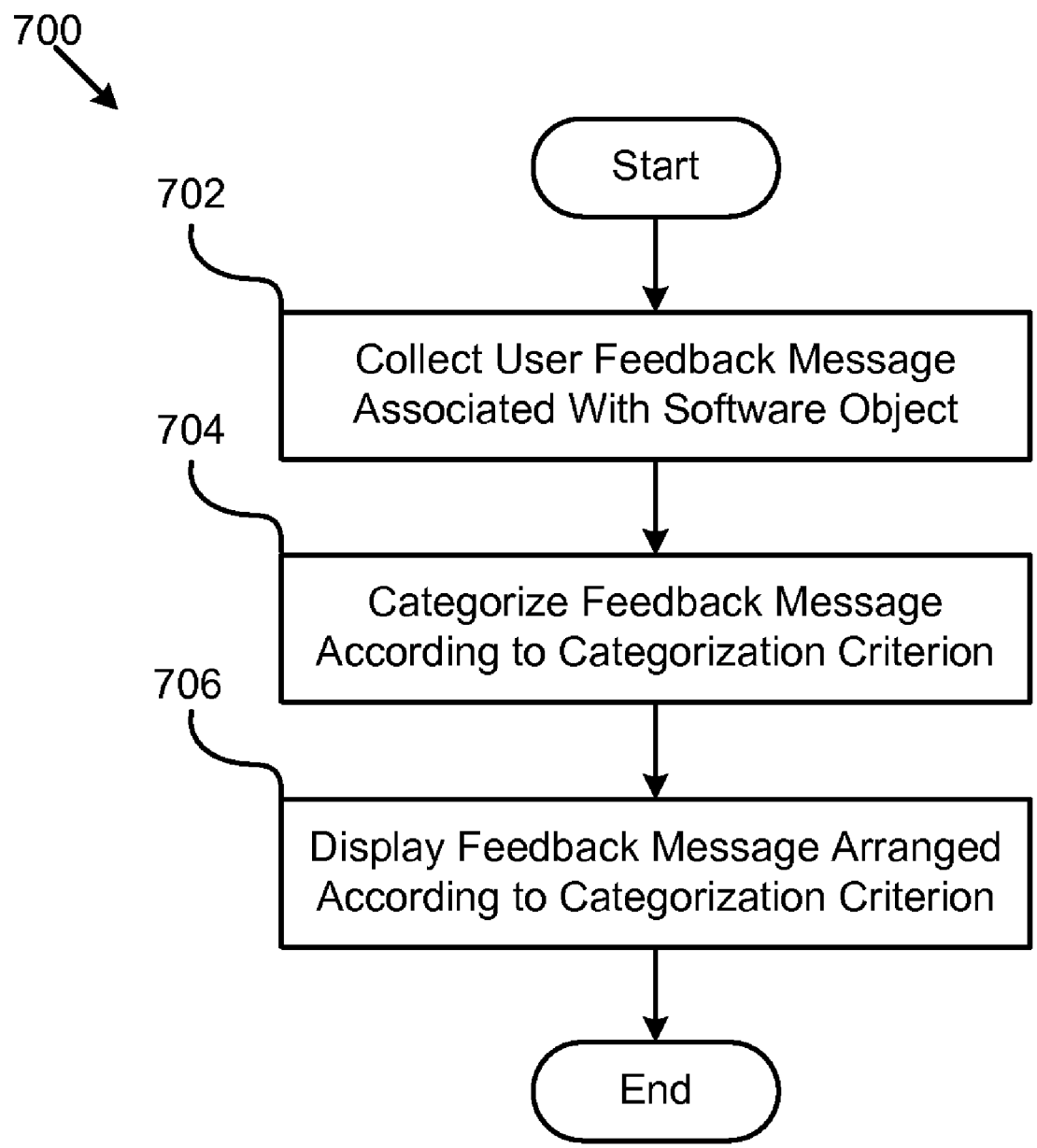
FIG. 7 is a schematic flowchart diagram illustrating one embodiment of a method for collecting software development feedback.

FIG. 7 illustrates one embodiment of a method 700 for collecting software development feedback. In one embodiment, the method 700 starts when the application host 104 collects 702 a user feedback message 502 associated with a software object 208, 210, 212. In one embodiment, the software object 208, 210, 212 may comprise a portion of an application user interface 202. In a particular embodiment, an integrated user feedback module may collect 702 the user feedback message 502. In such an embodiment, the integrated user feedback module is integrated into the application user interface 202. In a particular embodiment, the integrated user feedback module may include a selectable hyperlink 302, and a user feedback form 402.

In a further embodiment, the method 700 includes categorizing the user feedback message 502 according to a user feedback criterion. The feedback data server 108 may categorize the user feedback message 502. For example, the feedback data server 108 may categorize the user feedback message 502 according to a categorization criterion indicated in a query of a database of user feedback messages 502 managed by the feedback data server 108. In one embodiment, the categorization criterion may include a user feedback topic 612, an average rating indicia 616, or a number of reader's ratings indicia 618.

The method 700 may also include displaying 706 the user feedback message 502. In such an embodiment, the display may comprise a menu 602 configured to display 706 the user feedback message in an arrangement according to the selected categorization criterion, and the method 700 ends.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for collecting software development feedback, the method comprising:
   collecting a user feedback message associated with a software object, the software object defining a portion of an application user interface;
   collecting, by use of a processor, a predetermined number of actions, the predetermined number of actions comprising actions that occurred just prior to collecting the user feedback message;
   categorizing the user feedback message according to a feedback categorization criterion; and
   displaying the user feedback message in a display arranged by a category identified by the categorization criterion.

2. The method of claim 1, wherein collecting a user feedback message further comprises:
   displaying a selectable identifier configured to recognize a selection event;
   triggering an interactive message collection mode in response to the selection event, the interactive message collection mode configured to obtain message data; and
   compiling the message data into a user feedback message.

3. The method of claim 2, wherein the selectable identifier is integrated into an application user interface.

4. The method of claim 2, wherein the interactive message collection mode further comprises:
   indicating that the interactive message collection mode has been initiated;
   collecting information associated with a software object, the software object defining a portion of the application user interface;
   collecting a description of a problem associated with the application user interface; and
   obtaining a priority rating associated with the problem.

5. The method of claim 2, further comprising indicating that the interactive message collection mode has been initiated by modifying the form of the pointer.

6. The method of claim 1, further comprising publishing the user feedback message in an interactive forum, the interactive forum configured to obtain a public priority rating.

7. The method of claim 1, wherein displaying the user feedback message further comprises:
   displaying a feedback message topic associated with the user feedback message; and
   displaying rating information associated with the feedback message topic.

8. A computer program product comprising a non-transitory computer readable medium storing computer usable program code executable to perform operations for collecting software development feedback, the operations of the computer program product comprising:
   collecting a user feedback message associated with a software object, the software object defining a portion of the application user interface;
   collecting a predetermined number of actions, the predetermined number of actions comprising actions that occurred just prior to collecting the user feedback message;
   categorizing the user feedback message according to a feedback categorization criterion; and
   displaying the user feedback message in a display arranged by a category identified by the categorization criterion.

9. The computer program product of claim 8, wherein the operations further comprise:
   display a selectable identifier configured to recognize a selection event;

trigger an interactive message collection mode in response to the selection event, the interactive message collection mode configured to obtain message data; and compile the message data into a user feedback message.

10. The computer program product of claim 9, wherein the operations further comprise displaying an application user interface to facilitate collection of the user feedback message, and wherein the selectable identifier is an integrated component of the application user interface.

11. The computer program product of claim 10, wherein the operations further comprise:

indicating that the interactive message collection mode has been initiated;

collecting information associated with a software object, the software object defining a portion of the application user interface;

collecting a description of a problem associated with the application user interface; and obtaining a priority rating associated with the problem.

12. The computer program product of claim 8, wherein the operations further comprise publishing the user feedback message in an interactive forum, the interactive forum configured to obtain a public priority rating from a viewer of the user feedback message.

13. The computer program product of claim 8, wherein displaying the user feedback message further comprises:

displaying a feedback message topic associated with the user feedback message; and displaying rating information associated with the feedback message topic.

14. The computer program product of claim 8, wherein the collected user feedback message comprises a screen capture of the portion of the application user interface.

15. A method for deploying computing infrastructure, comprising integrating computer-readable code into a computing system, wherein the code in combination with the computing system is configured to perform operations configured to collect software development feedback, the operations comprising:

integrating a feedback module in an application user interface configured to collect a user feedback message associated with a software object, the software object defining a portion of the application user interface;

collecting, by use of a processor, a predetermined number of actions, the predetermined number of actions comprising actions that occurred just prior to collecting the user feedback message;

categorizing the user feedback message according to a feedback categorization criterion; and displaying the user feedback message in a display arranged by a category identified by the categorization criterion.

16. The method of claim 15, wherein collecting a user feedback message further comprises:

displaying a selectable identifier configured to recognize a selection event;

triggering an interactive message collection mode in response to the selection event, the interactive message collection mode configured to obtain message data; and compiling the message data into a user feedback message.

17. The method of claim 16, wherein the interactive message collection mode further comprises:

indicating that the interactive message collection mode has been initiated;

collecting information associated with a software object, the software object defining a portion of the application user interface;

collecting a description of a problem associated with the application user interface; and obtaining a priority rating associated with the problem.

18. The method of claim 15, further comprising publishing the user feedback message in an interactive forum, the interactive forum configured to obtain a public priority rating.

19. The method of claim 15, wherein displaying the user feedback message further comprises:

displaying a feedback message topic associated with the user feedback message; and displaying rating information associated with the feedback message topic.

20. The method of claim 19, wherein the feedback message topic is selectable, and wherein the user feedback message is displayed in response to selection of the feedback message topic.

* * * * *